Dec. 31, 1940.                H. W. PRICE                2,227,273
                          TRANSMISSION CONTROL
             Filed Sept. 6, 1938              5 Sheets-Sheet 1
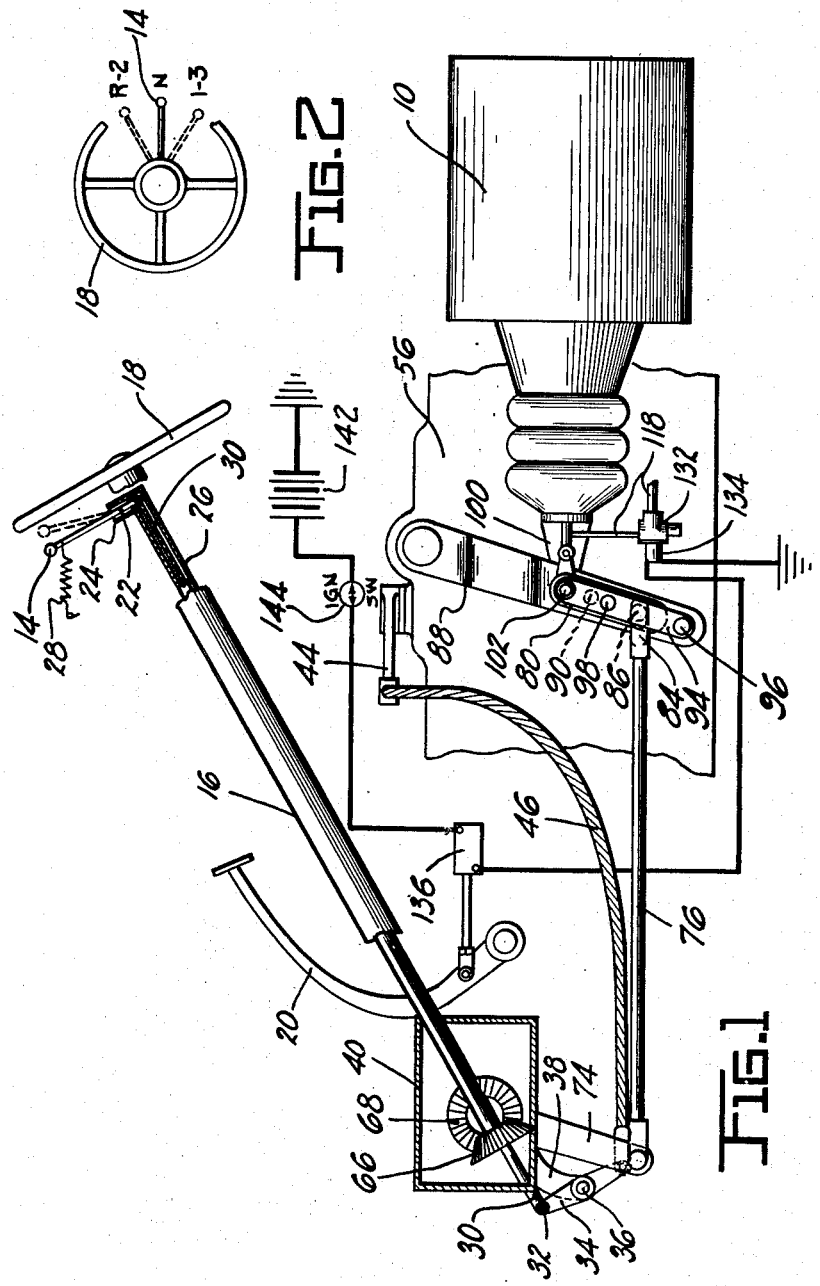
INVENTOR
HAROLD W. PRICE
BY H. O. Clayton
ATTORNEY

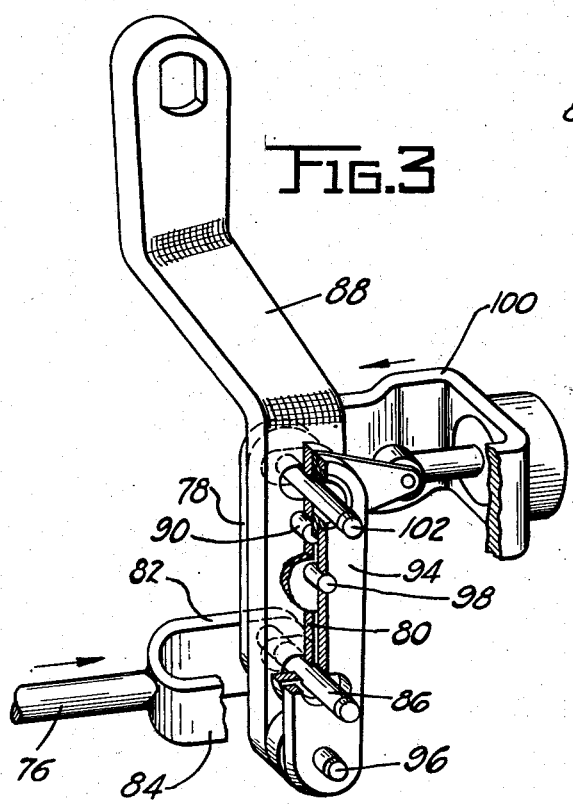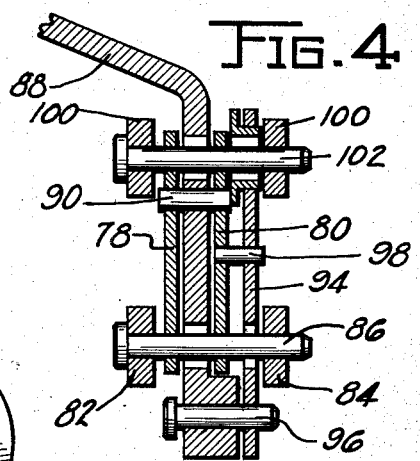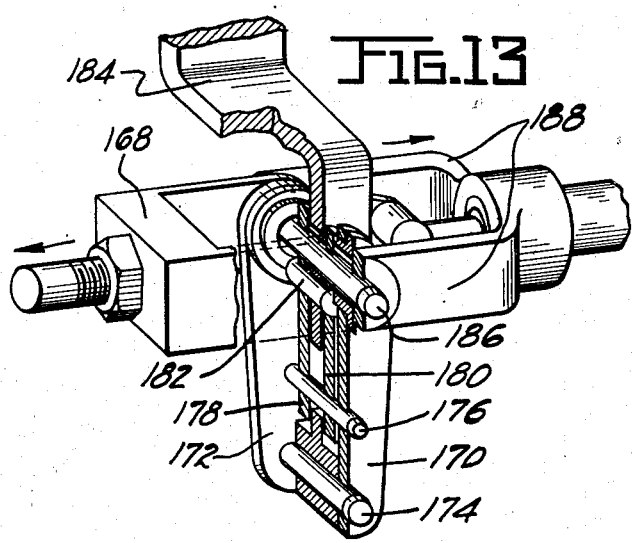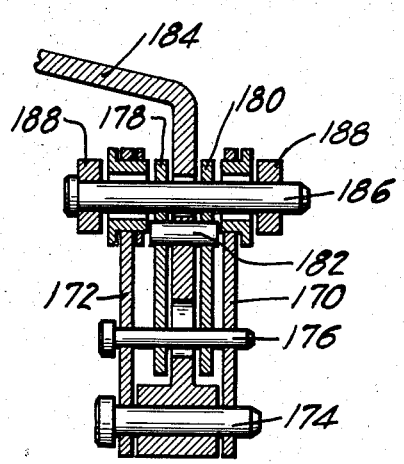

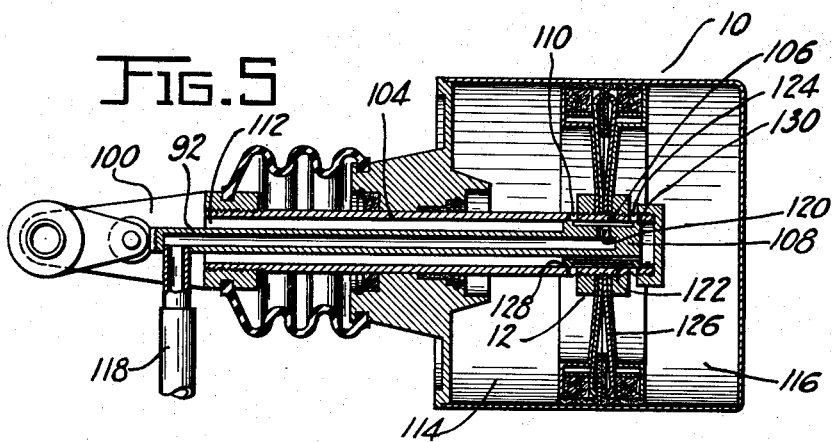
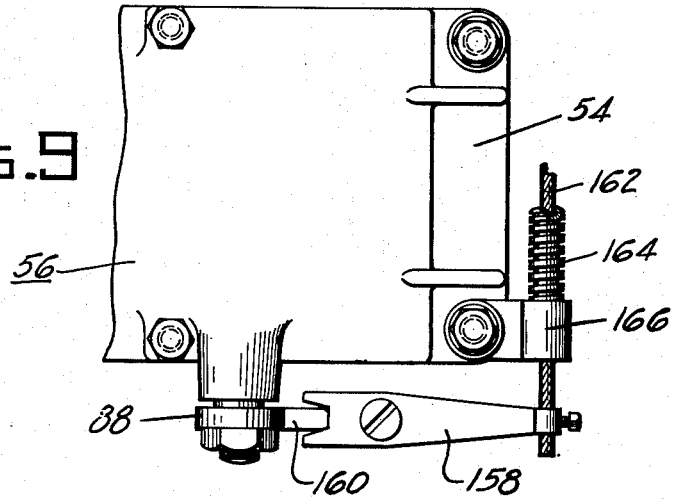
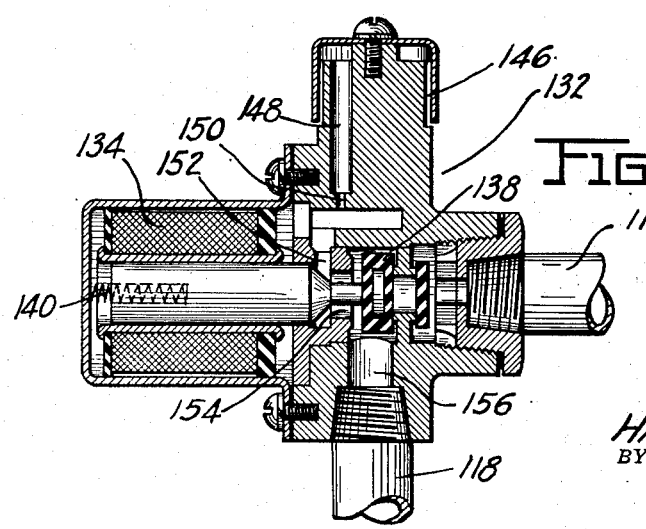

Dec. 31, 1940.  H. W. PRICE  2,227,273
TRANSMISSION CONTROL
Filed Sept. 6, 1938    5 Sheets-Sheet 5

INVENTOR
HAROLD W. PRICE
BY H. O. Clayton
ATTORNEY

Patented Dec. 31, 1940

2,227,273

UNITED STATES PATENT OFFICE 2,227,273

TRANSMISSION CONTROL

Harold W. Price, South Bend, Ind., assignor to Bendix Aviation Corporation, South Bend, Ind., a corporation of Delaware Application September 6, 1938, Serial No. 228,484

1 Claim. (Cl. 74—335)

This invention relates to motor vehicles and more particularly to controlling means for the change-speed transmissions thereof.

There have been proposed various substitutes for the transmission, the transmission gear shifting lever, various positions for the shifting lever, and other modifications of the present generally used system, all designed for the purpose of simplifying the operations required of the driver. Some of these proposals are automatic, or semi-automatic, in their action, but most of them are more complicated to design, to manufacture and to service than is the construction now in general use, and they are, for these reasons, objectionable. On the other hand, there are definite objections to the construction now in general use and there is definite need for improvement, if such improvement may be accomplished without running into the complications which form so powerful an obstacle to the prior proposals.

One of the objections to the present system is the length of movement required of the gear shift lever or, if the movement is small, the relatively large force required to move said lever. It is also to be noted that the present day gear shift lever constitutes an obstruction in the driver's compartment and prevents complete freedom of movement of the driver and other occupants.

It is therefore one of the objects of the present invention to provide a transmission gear control mechanism so constituted as to avoid the above-referred-to difficulties.

A further object is to provide, in a manually controlled power operated gear shifting mechanism, a novel control apparatus therefor including an arrangement insuring that the extent of movement of the gear shifting member will be substantially proportional to the extent of movement of the control member, whereby an exceedingly accurate control may be exercised by the operator over the shifting of the gears. Such a mechanism is known in the art as a follow-up control, and in one embodiment of my invention there is disclosed a so-called line type of follow-up valve for controlling a vacuum suspended motor operable to establish the transmission in any one of its four settings.

A still further object is to provide a fluid pressure operated power gear shifting mechanism having a manually operable control member and means controlled thereby in such a manner that the movements of such control member to effect a shifting of the transmission gears will be resisted by a force substantially proportional to the extent of movement of the gear shifting member and also proportional to the force exerted by the transmission operating power means, whereby a "feel" or reaction to shifting will be experienced by the operator in a manner simulating the reaction encountered in manually shifting transmission gears in the conventional manner.

Other objects of the invention and desirable details of construction and combinations of parts will become apparent from the following detailed description of certain embodiments of the invention, taken in conjunction with the accompanying drawings illustrating said embodiments, in which:

Figure 1 is a diagrammatic view disclosing the principal elements of the transmission operating mechanism constituting my invention;

Figure 2 is a plan view of the steering wheel of a motor vehicle, together with the selector for controlling the transmission operating mechanism;

Figure 6:
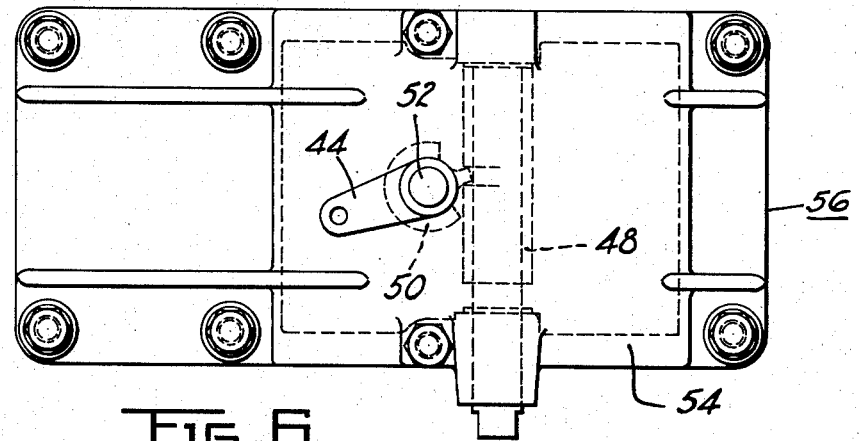
Figure 7:
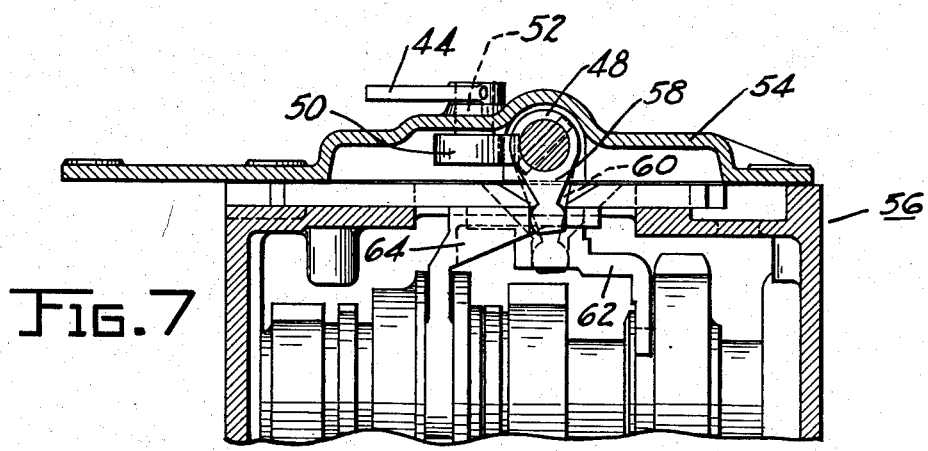
Figure 8:
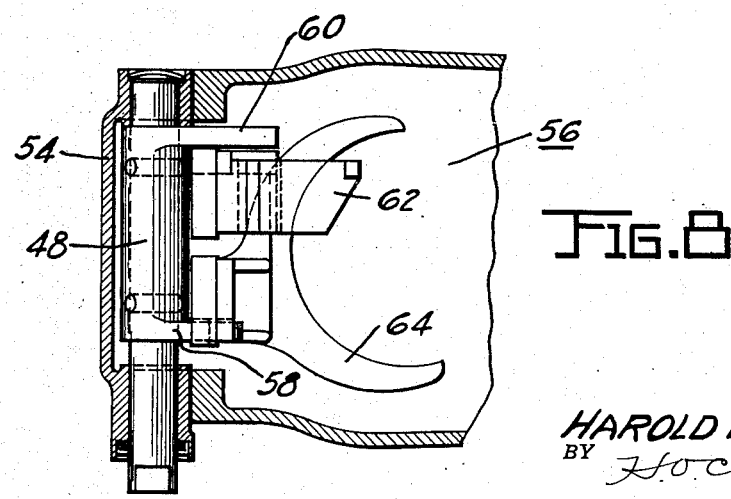
Figure 10:
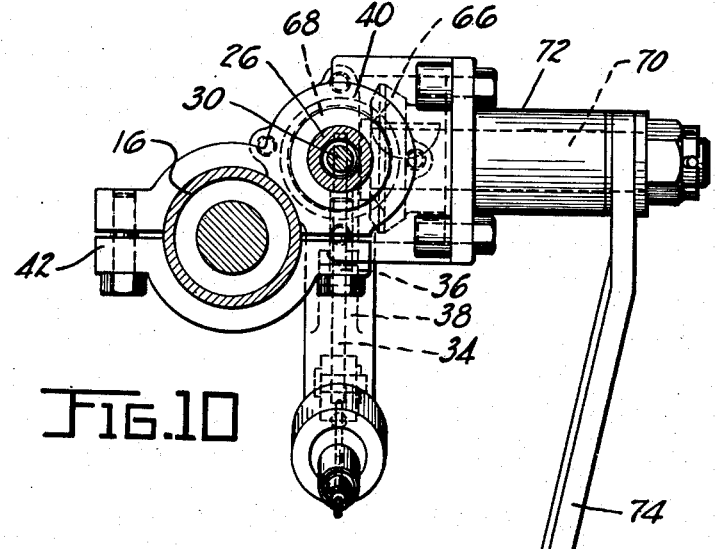
Figure 11:
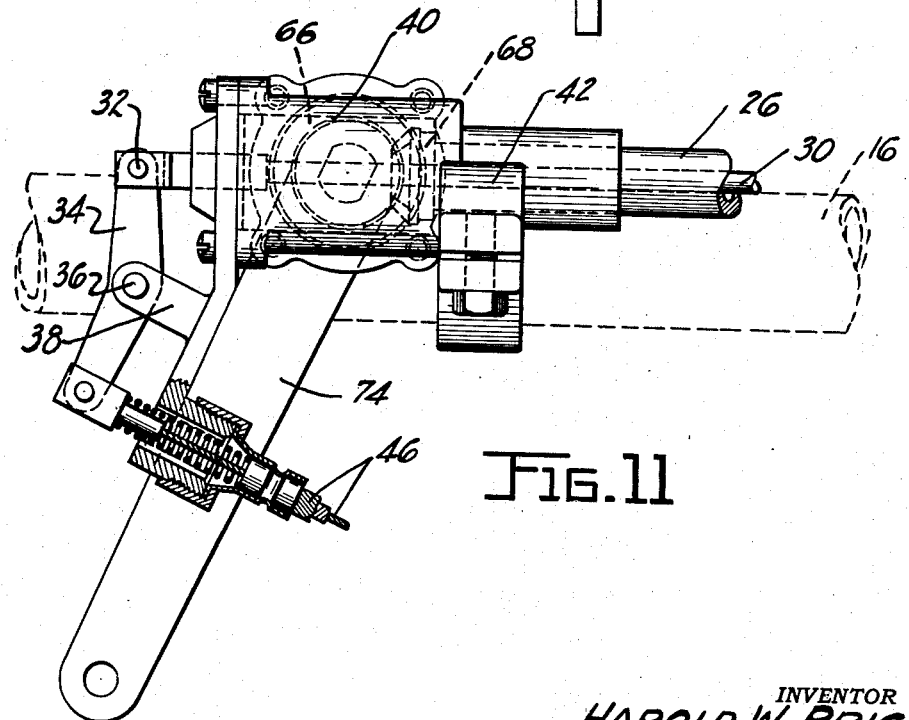

Figures 3 and 4 disclose, in detail, the principal portion of the transmission and valve operating linkage of my invention;

Figure 5 is a sectional view of the transmission operating motor, disclosing, in detail, the valve mechanism for controlling the operation of the motor;

Figures 6, 7 and 8 are views of of the change-speed transmission operated by the transmission operating means constituting the essence of my invention;

Figure 9 is a view disclosing a modified form of connection between the transmission disclosed in Figures 6, 7 and 8 and the transmission operating means constituting my invention;

Figures 10 and 11 are views disclosing details of the gearing mechanism mounted on the end of the steering post and constituting a portion of the means for both operating the transmission and controlling the operation of the transmission operating motor;

Figure 12 is a sectional view of the solenoid operated cut-out valve for the transmission operating motor; and Figures 13 and 14 are views, similar to Figures 3 and 4, disclosing a modified form of transmission and valve operating linkage.

In that embodiment of my invention disclosed in Figure 1, a transmission operating double-acting pressure differential operated motor 10, preferably though not necessarily of the vacuum suspended type, is controlled by a so-called internal valvular mechanism 12 mounted within the motor and disclosed in detail in Figure 5. The valve mechanism is preferably operated by a selector, or what may be termed a miniature shift lever 14, preferably mounted on the steering post 16 beneath the steering wheel 18 in such a position as to be readily operated by the fingers of the driver. The selector may also be mounted in the dash of the vehicle within reach of the driver.

The principal elements of my invention having been referred to, the operation of the transmission operating power means will now be described and, incidentally, a detailed description of the mechanism given. Describing the sequence of operations of the transmission, after having started the engine to produce a source of vacuum from the intake manifold, the clutch pedal 20 is depressed to disengage the clutch. The shift lever 14, which is pivotally mounted at 22 to a hollow casing 24 projecting from the upper end of a tubular member 26, is then rotated upwardly against the action of a spring 28 to the position disclosed in dotted lines in Figure 1. The member 26 is secured to the steering post by brackets, not shown. Incidentally, it is to be noted that the shift lever 14 is shown 90° out of position for the purpose of illustration.

The above-described operation may be defined as the cross-shift movement of the selector and is, of course, to a degree similar to the lateral movement of the conventional gear shift lever of the standard transmission operating mechanism of the day. With this movement of the selector, a rod 30, secured at its upper end to the shift lever, is bodily moved downwardly through the tube 26. The rod is pivotally connected at its lower end 32 to a lever 34 pivotally mounted at 36 to a bracket 38. This bracket extends from a gear housing 40 secured to the lower end of the steering post 16 by a bracket 42. The actuation of the lever 34 serves to rotate a crank 44, Figure 1, the lever and crank being interconnected by means of Bowden wire connection 46. Rotation of the crank 44 effects a lateral movement of a sleeve 48, the sleeve and crank being interconnected by means of a pinion 50 mounted on one end of a pin 52, said pinion being housed within the top 54 of a change-speed transmission 56. Lateral bodily movement of the sleeve 48 moves projections 58 and 60 extending therefrom, which projections select one or the other of the gear operating forks 62 and 64, all as disclosed in Figures 7 and 8.

After the first and reverse gear fork 62 of the transmission has been selected, the shift lever 14 is moved angularly clockwise to place the transmission in low gear. With this movement, the tube 26 is rotated, resulting in the rotation of a bevel gear or pinion 66 secured thereto, all as disclosed in Figures 1, 10 and 11. The pinion 66 meshes with a bevel gear 68 mounted on one end of a pin 70 journaled in a housing 72, all of these elements being housed within the casing 40. To the outer end of the pin 70 is secured a crank 74.

The clockwise movement of the selector thus effects a counterclockwise movement of the crank 74, placing a link 76 under compression. Referring now to Figures 3 and 4, disclosing in detail the valve and transmission operating linkage, the aforementioned movement of the link 76 in the direction of the arrow of Figure 3 serves to rotate, in a counterclockwise direction, a pair of so-called reaction links 78 and 80, connected to the furcations 82 and 84 of the yoked end of the link 76 by means of a pin 86. As disclosed in Figures 3 and 4, the links 78 and 80 are secured to a so-called transmission operating power lever or crank 88 by means of a pin 90. Rotation of the links 78 and 80 about the pin 90 as a fulcrum serves to place a valve operating tubular member 92, Figure 5, under compression, said member being connected to the reaction links by means of a crank or valve operating lever 94 pivotally mounted to the crank 88 by means of a pin 96, said crank 94 being connected to the reaction link 80 by a pin 98. In this operation, the crank 94 fulcrums on the pin 96, the power lever 88, of course, remaining stationary until the valve is cracked.

Completing the description of the valve cracking operation, when the links 78 and 80 rotate counterclockwise about the pin 90, a yoke 100, connected to the links 78 and 80 by means of a pin 102, is moved to the left in the direction of the arrow in Figure 3. This movement of the yoke 100 serves to move to the left a hollow connecting rod 104 connected thereto, and, as above described, the valve operating member 92 is moved to the right at the same time. As disclosed in Figure 5, the valve operating members 92 and 104 are provided at their ends with valve members 106 and 108, the latter constituting a portion of the hub of the piston member of the vacuum suspended motor 10. When the members 92 and 104 are moved to the right and left respectively, port 110 in the valve member 106 is brought into registry with the interior of the hollow connecting rod 104, which is vented, via its end 112, to the atmosphere.

It should be noted here that in the position disclosed in Figure 5, that is when the transmission is neutral and the selector is in its neutral position, both of the compartments 114 and 116 of the motor 10 are connected to the intake manifold via conduit 118, tube 92, valve port 120, recess 122, valve port 110 and valve port 124. When the engine is idling, creating a vacuum in the intake manifold, the compartments 114 and 116 are partially evacuated by virtue of the aforementioned connections, thus providing what is termed in the art "a vacuum suspended motor."

Continuing the detailed description of the operation of the valve and the resulting operation of the motor, when the compartment 114 is vented to the atmosphere, the resulting differential of pressure to which the motor piston 126 is subjected results in a movement of the piston to the right to thereby establish the transmission in low gear, it being remembered that the shift lever 14 had been moved to select the first and reverse shift rail for operation. However, in order to complete the low gear operation of the transmission, the shift lever 14 must be moved to its extreme low gear position, whereupon the corresponding movement of valve members 106 and 108 will keep the valve open to thereby energize the motor. If the operator desires to only partially mesh the gears, he moves the selector to a position short of its extreme low gear position, this operation resulting, with applicant's mechanism, in what is known in the art as a follow-up to-lap operation of the valve mechanism 12.

Describing this operation in detail, after the valve is cracked, that is opened, by the simultaneous movement in opposite directions of the valve members 106 and 108 and the movement of the shift lever 14 then suspended, there follows the movement of the piston 126 and its connected valve member 106 to the right, Figure 5, until land portions 128 and 130 on the spool-shaped valve member 108 cover the ports 110 and 124. The valve is now in the so-called lapped position, and the low gears of the transmission remain only partially engaged, or rather the low gear establishing movement of the transmission operating crank 88 is only partially completed. If the selector is again moved toward its low gear position, the above-described operation is repeated, the valve members being again moved to crack the valve. It might be noted here that inasmuch as both valve members 106 and 108 are moved in opposite directions at the same time this results in a very rapid cracking of the valve with the resulting much-desired fast operation of the motor 10 to establish the transmission in low gear.

Describing now the aforementioned so-called "feel" operation of the mechanism constituting my invention, referring again to Figures 3 and 4, when the movement of the shift lever 14 is suspended, as above described, the subsequent movement of the yoke 100 to the right, or downwardly from the plane of the paper in Figure 4, results in a load, transmitted by pin 86, from the reaction levers 78 and 80 in a direction up from the plane of the paper, Figure 4, thus imposing a load upon the selector lever, which, of course, is a function of the degree of pressure to which the motor piston 126 is subjected. Briefly describing the follow-up and feel functions of the mechanism constituting my invention, the movement of the shift lever 14 to effect the low gear setting of the transmission fully simulates a corresponding movement of a conventional gear shift lever, and the feel or resistance to movement of the selector is a function of the load upon the transmission operating crank arm 88 from the motor 10.

Having established the transmission in low gear, the speed of the vehicle is increased, as desired, whereupon the clutch is again disengaged and the selector moved to its neutral position prior to its cross-shift movement and subsequent movement to its second gear position. Inasmuch as the operation of the valve mechanism 12 is simply reversed when the selector is moved to neutral and second gear position, a detailed description of this obvious operation of the mechanism will not be described in detail. It might be noted, however, that when the shift lever is moved to its neutral position from the low gear position the biasing spring 28 then automatically functions to return the shift lever to the full line position disclosed in Figure 1. The selector is, of course, then moved to place the transmission in second gear.

One feature of my invention relates to the means for preventing the above-described power operation of the transmission until the clutch is disengaged. To this end a three-way valve 132, Figure 12, operated by a solenoid 134, is incorporated in the conduit 118, interconnecting the intake manifold, not shown, with the motor 10. When and only when the clutch is disengaged by the pedal 20, or, if desired, by power means such as disclosed in Belcia Patent No. 1,470,272, a circuit breaker switch 136 is operated to complete an electrical circuit to energize the solenoid. When the solenoid is energized, a valve member 138 of the three-way valve is moved upwardly from the position disclosed in Figure 12 against the tension of a return spring 140 to interconnect the partially evacuated manifold with the motor 10 to thus permit an energization of the motor to establish the transmission in gear. When the clutch is engaged, the circuit, which includes a battery 142, the vehicle's ignition switch 144, the breaker switch 136 and the solenoid 134, is broken and the spring 140 functions to move the valve member 138 to a position disclosed in Figure 12, in which position the motor 10 is vented to atmosphere via slot 146, duct 148, port 150, duct 152 and ports 154 and 156.

Referring to Figure 9, there is here disclosed a modified form of connection between the transmission disclosed in detail in Figures 6, 7 and 8 and the mechanism for operating the transmission constituting my invention. The sleeve 48, disclosed in Figure 7, is bodily moved, to select the rail to be operated, by a lever 158 notched at one of its ends to receive an arm or tab 160 secured to the upper end of the crank 88. The lever is actuated by means of the cable 162 of a Bowden control, the conduit 164 of which is secured by a bracket 166 to the cover plate 54 of the transmission 56.

There is disclosed in Figures 13 and 14 a modified form of so-called follow-up and feel-producing valve and transmission operating linkage. Briefly describing this linkage and its operation, which is similar in function to the linkage disclosed in Figures 3 and 4 and is designed to operate the valve mechanism of the motor of Figure 5, when the selector operated valve operating yoke 168 is moved in the direction indicated by the arrow in Figure 13, there results a counterclockwise movement of links 170 and 172 about the then immovable pin 174 as a fulcrum. This movement effects, by means of pin 176, a clockwise rotation of so-called reaction links 178 and 180 about a pin 182 as a fulcrum, the latter being secured to a transmission operating power arm or crank 184. This clockwise movement of the reaction links 178 and 180 serves, through the intermediary of a pin 186, to move a valve operating yoke 188 downwardly from the plane of the paper, Figure 14, the simultaneous movement of the yokes 168 and 188 effecting the above-described rapid cracking of the valve.

Describing the valve lapping operation of this valve operating linkage and also the resultant so-called feel reaction, when the driver of the vehicle only partially moves the selector toward, say, its low gear position, the yoke 168 is, of course, momentarily held stationary, and immediately thereafter the yoke 188, loaded by the piston 126 of the motor 10, moves to the left, Figure 13, to move the power arm 184 in a clockwise direction and thus move the low and reverse gear shift rail toward its low gear position. This movement laps the valve as described in detail supra. As to the feel or increased load imposed upon the selector, it will be noted that the reaction links 178 and 180 function as a lever of the second class as the crank 184 is being moved. The reaction links pivoting about pin 176 as a fulcrum impose a load upon the links 170 and 172 and consequently upon the yoke 168, which load is a function of the pressure exerted upon the motor piston. This load is defined in the art as the feel of the transmission control lever, that is, the shift lever 14.

Although this invention has been described in connection with certain specific embodiments, the principles involved are susceptible of numerous other applications that will readily occur to persons skilled in the art. The invention is, therefore, to be limited only as indicated by the scope of the appended claim.

I claim:

In an automotive vehicle provided with a change-speed transmission and a steering post, a bracket secured to the extreme lower end of said steering post and a gear housing integrally connected with said bracket, power means for in part operating the transmission, said power means including a pressure differential operated motor and valve mechanism for controlling the operation of said motor, manually operated means for operating said valve mechanism and in part operating the transmission, said manually operated means including a tubular member secured to the steering post by said bracket and extending parallel to the post, a rod telescoped within said tubular member, and means including a bracket secured to said gear housing, a lever mounted on said bracket, and a Bowden control interconnecting said lever and the shift rail selecting mechanism of the transmission, and means interconnecting said tubular member and shift rail operating mechanism of the transmission including a plurality of intermeshing gears housed within said gear housing.

HAROLD W. PRICE.